United States Patent [19]
Green

[11] 3,737,120
[45] June 5, 1973

[54] RADAR MAP COMPARISON GUIDANCE SYSTEM

[75] Inventor: Elberson D. Green, Santa Ana, Calif.

[73] Assignee: The United States of America as represented by the Secretary of the Navy

[22] Filed: Dec. 7, 1967

[21] Appl. No.: 690,707

[52] U.S. Cl. ............244/3.17, 343/5 MM, 343/7 ED
[51] Int. Cl. ..........................F42b 15/02, G01s 9/02
[58] Field of Search............343/5 MM, 7 ED, 5 CM; 244/3.17

[56] References Cited

UNITED STATES PATENTS 3,459,392  8/1969  Buynak et al.........................244/3.17

Primary Examiner—Malcolm F. Hubler
Attorney—Raymond I. Tompkins, John W. Pease and Harvey A. David

[57] ABSTRACT

A map matching vehicle guidance system wherein a launching vehicle having variable resolution, synthetic aperture mapping radar makes a series of maps of graduated resolution all from a substantial distance from the target, deposits the maps in the launched or guided vehicle which carries conventional, non-processing mapping radar, and wherein the guided vehicle carries map comparing means for sequentially comparing the graduated resolution maps with instantaneous maps from its own radar to provide error signals to correct an otherwise inertial guidance system in directing the guided vehicle to its target.

6 Claims, 2 Drawing Figures

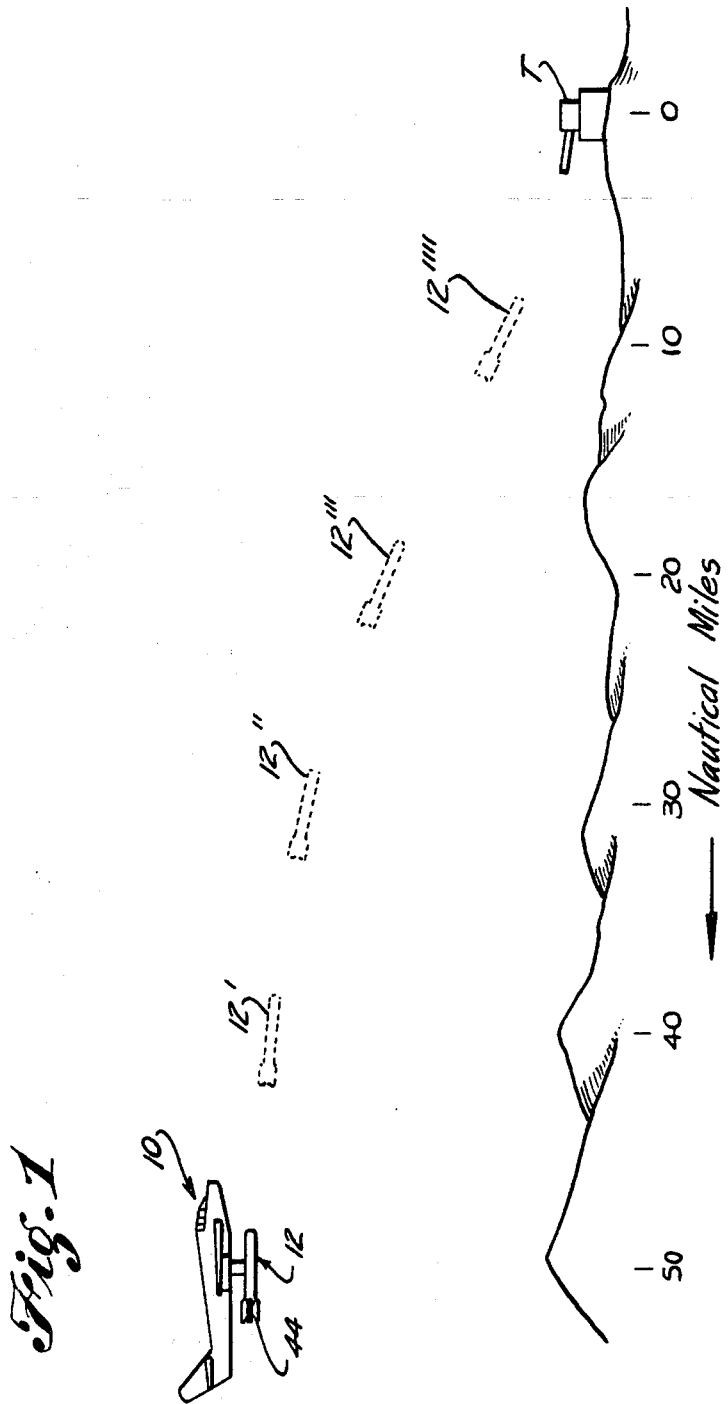

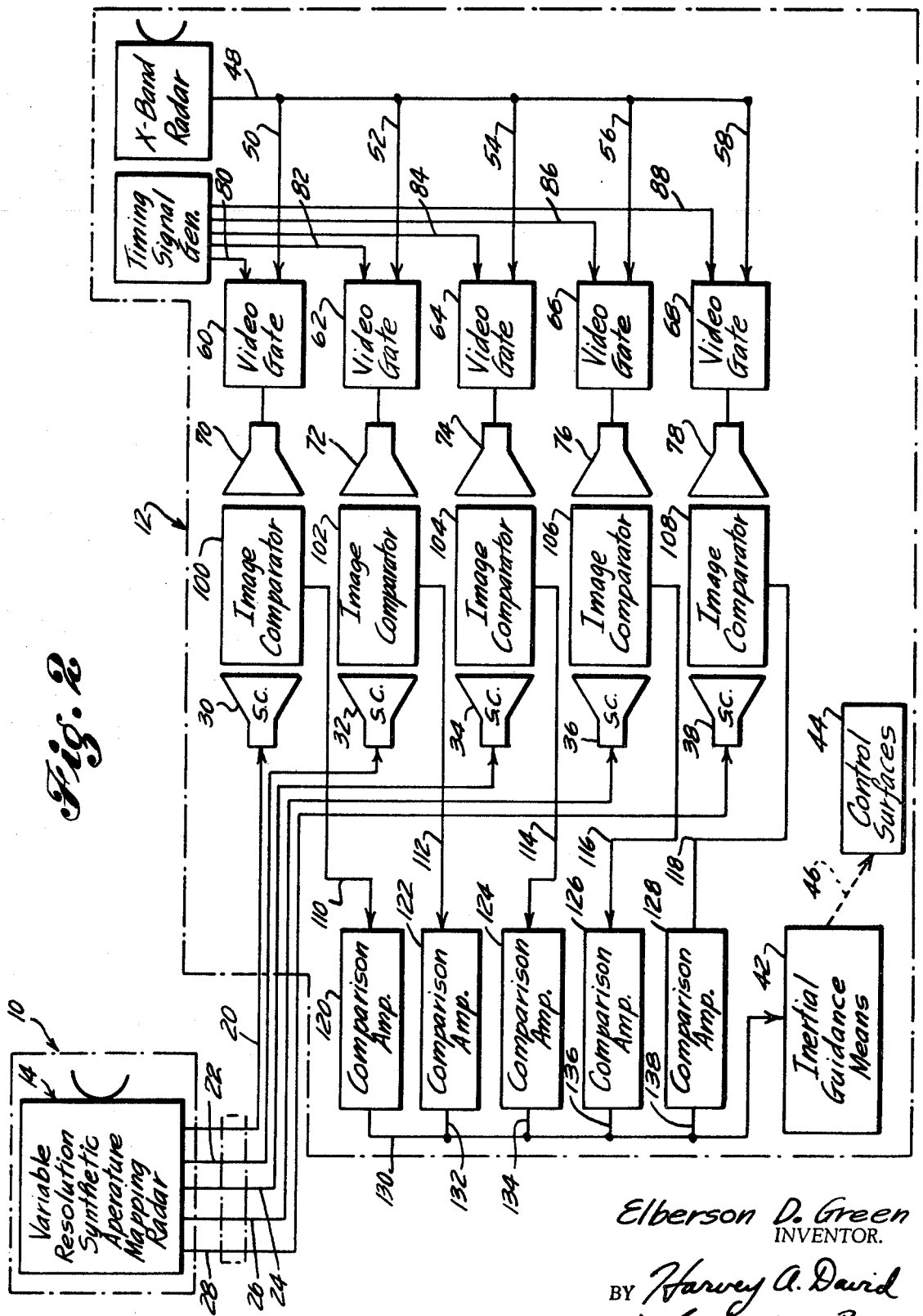

RADAR MAP COMPARISON GUIDANCE SYSTEM

BACKGROUND OF THE INVENTION

The guidance of aircraft and missiles by alignment of presently gathered radar map data with previously gathered radar map data has been successfully accomplished in the past. However, the systems for doing so have usually employed the technique that the first or master map is obtained by flying over the actual course that the following or map matching vehicle or missile will take.

Recent developments have brought the art of synthetic aperture mapping radar to a state of capability of making high resolution maps from data gathered at substantial distances of 50 nautical miles or more, and whereby definition of objects or features on the order of 15 feet in size or less may be obtained. In addition to getting very fine resolution at great ranges, such radars can have the ability to zoom or alter the resolution at any particular range.

SUMMARY OF THE INVENTION

The present invention has as a principal object the provision of a map comparing guidance system and method wherein the master map is obtained without the necessity of the map making vehicle first traversing the course that will eventually be followed. The advantage of such a system is in the delivery of weapons. With the present invention, a missile launching vehicle can stand off at a great distance from a target, make a master map of a course to be followed, deposit the master map in the missile, launch the missile, and leave. This technique leads to the highly desirable weapon system of launch and leave as contrasted with launch and guide or launch and monitor systems which require that the launching vehicle remain in a relatively exposed position until the weapon has reached its target. The invention also obviates the need for a reconnaissance or map making trip at some earlier time by a map making vehicle over probably dangerous enemy territory to obtain a suitable map for later use in a launch and leave weapon system of the earlier mentioned map comparing type.

As another object, the invention aims to achieve the foregoing through the provision of a novel method and system whereby the map making aircraft makes a high resolution map of the target area, for example 15 foot resolution, from a relatively safe distance on the order of 50 nautical miles or more, and also making from that distance a number of lower resolution maps by the aforementioned zoom technique to provide a series of maps of different resolution, corresponding to the resolutions which would be obtained at different predetermined ranges by a conventional forward looking mapping radar that is carried by a missile or other vehicle to be guided and has lower power and has the resolution ability of ordinary non-processing radars. The series of different resolution maps are deposited in the guided vehicle which, according to the system of this invention, includes map comparison and guidance means. As the guided vehicle flight progresses, the system successively correlates the natural resolution maps its radar obtains with the graduated resolution maps obtained with the radar of the launching vehicle, and utilizes differences therebetween to effect course corrections to direct the guided vehicle to the target.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 1 is a diagrammatic illustration of a guided missile and launching aircraft utilizing the map matching guidance system of the invention, and their relation to a target; and FIG. 2 is a block diagrammatic illustration of the map matching guidance system embodying the invention.

DESCRIPTION OF THE PREFERRED EMBODIMENT

In the form of the invention illustrated in the drawings and described hereinafter, an aircraft 10 is shown carrying a missile 12 which is intended to be launched by the aircraft and directed at a target T from a substantial distance, immediately after which the launching aircraft can be withdrawn. In the present example the aircraft 10 launches the missile 12 from a distance of about 50 nautical miles from the target T, and the missile is guided by the radar map matching guidance system of this invention to the target.

To this end, the aircraft 10 is provided with a variable resolution synthetic aperture mapping radar 14 (FIG. 2), which is capable of making high resolution maps of features of a target T (FIG. 1) and its immediately surrounding area from a great distance, in this example, a distance of 50 nautical miles, with a resolution of 15 feet. Also, the radar 14, which is of the type known as a processing radar wherein high resolution is obtained by integrating data over a substantial time period, is capable of making maps of lesser resolution, as by integrating over lesser time periods.

The missile 12 is also provided with a mapping radar 16, however, this radar is preferably of considerably less power and provides only that resolution obtained with ordinary non-processing type radars. Thus, the radar 16 may conveniently be a conventional X-Band radar.

The maps made by the radar 14 may be made in either a fixed angle mode or a forward scan mode, as will be understood by those skilled in the art to which the invention pertains, but less radiation time will be involved if the forward scanning mode is used. Suffice it to say that the principles of the invention apply in either case, and that the present example will be considered to be of the forward scan variety. In either event, the radar 14 is utilized to produce a series of discrete maps made with different resolutions, each being of a resolution commensurate with that which would be obtained by the X-Band radar 16 of the missile 12 at a predetermined distance from the target T. Thus, if the radar 14 made a map with a resolution corresponding to that of the radar 16 for each ten mile increment of distance from the target T, there would be five different maps produced, with the finer resolution maps corresponding to the points closer to the target.

The data for these maps is accumulated by the radar 12 at the illustrated fifty mile location of the aircraft 10, and conveyed as indicated by flow lines 20, 22, 24, 26, and 28 to storage type cathode ray tubes or scan converters 30, 32, 34, 36, and 38, respectively, which are included in that part of the system which is carried by the missile 12. In the scan converters the data is painted in the form of maps which are graduate with respect to fineness of resolution. Thus, the coverter 30 has stored thereon a map of the target area and approach thereto made at a resolution commensurate with that of the X-Band radar 16 carried by the missile 12 when the latter is fifty miles from the target T. The converter 32 has stored thereon a map of the target area and approach thereto made at a resolution commensurate with that of the radar 16 when the missile 12 is 40 miles from the target T. The converter 34 has a map commensurate in resolution with the radar 16 at thirty miles from the target, the converter 36 has a map commensurate in resolution with the radar 16 at twenty miles from the target, and the converter 38 has a map commensurate in resolution with the radar 16 at ten miles from the target.

Now, with the maps so stored or deposited in the scan converters, the missile is launched toward the target, the conductors represented by lines 20, 22, 24, 26, and 28 being parted as by suitable separable connector or guillotine means.

When the missile is first launched it is held on a course generally in the direction of the target T by an inertial guidance means 42 which may be any one of the well known, relatively simple inertial means which are readily available and which are capable of accepting course correcting or updating error data as an input thereto. The guidance means 42 operates suitable missile steering mechanisms such as control surfaces symbolically represented at 44 through connecting means 46.

After the missile 12 is launched and stabilized by the inertial guidance means 42 on an initial, pre-set heading generally in the direction of the target T, the heading or course which the guidance means is to maintain is periodically updated in response to comparisons of instantaneous radar maps obtained from the X-Band radar 16 with the previously prepared maps from the radar 10 and now stored on the scan converters 30, 32, 34, 36, and 38. To this end, the radar 16 has its video output signals on line 48 conveyed via lines 50, 52, 54, 56, and 58 to a plurality of video gates 60, 62, 64, 66, and 68, respectively.

The video gates 60, 62, 64, 66, and 68 are connected as shown to cathode ray display tubes 80, 82, 84, 86, and 88, respectively, and are individually enabled to pass the radar map video signals thereto in response to timing signals conducted to the gates via lines 80, 82, 84, 86, and 88 from a timing signal generator 90, the purpose of which will become apparent as the description proceeds.

The display tubes 70, 72, 74, 76, and 78 are each disposed adjacent an input side of one of a plurality of image comparators 100, 102, 104, 106, and 108. The scan converters 30, 32, 34, 36, and 38 are disposed on the other input sides of the image comparators 100, 102, 104, 106, and 108, respectively.

The image comparators 100, 102, 104, 106, and 108 are adapted to compare instantaneous map images, as they are sequentially presented in accordance with timing signals from the generator 90, on the associated display tubes 70, 72, 74, 76, and 78, with stored map images on the associated scan converters 30, 32, 34, 36, and 38, and to provide on lines 110, 112, 114, 116, and 118 output signals corresponding to direction of non-registration of the display tube images with the scan converter images. The comparators 100, 102, 104, 106, and 108 for comparing the instantaneous radar map images on the display tubes with the stored, graduated resolution map images stored on the scan converters may conveniently be of the type having a spirally driven lens system such as is described in U. S. Pat. No. 3,155,969, although there are other image comparator means which will satisfy the requirements of the system of this invention.

The directional signals on lines 110, 112, 114, 116, and 118 are amplified in comparison amplifiers 120, 122, 124, 126, and 128, respectively, to provide course correction or error signals via lines 130, 132, 134, 136, and 138 to the inertial guidance means 42.

The timing signal generator 90 provides a first enabling pulse only to the video gate 60 shortly after the missile is stabilized on its initial pre-set course, whereupon the gate 60 passes the video output of the missile carried radar 16 to the display tube 70 to provide thereon a substantially instantaneous map of the target area and terrain leading thereto. The resolution of this map on tube 70 is limited by the capabilities of the radar 16 at the approximately fifty mile range at which the timing signal generator gives its first enabling pulse.

The map on tube 70 is compared by comparator 100 with the map of comparable resolution previously prepared by radar 14 and stored on converter 30. The result of the comparison is a signal on line 110 indicative of direction and amount of non-registration between the maps. This signal is amplified by a comparison amplifier 120, which is one of a plurality of such amplifiers 120, 122, 124, 126, and 128, to provide on line 130 an error signal to the inertial guidance means 42. The guidance means 42 is thereby updated to maintain a new course which should bring the missile 14 to the target. The means 42 then maintains such course until a new error signal is derived.

When the missile has travelled 10 miles to the dotted line position of the missile indicated at 12', the timing signal generator 90 sends an enabling pulse only to the gate 62, whereupon an instantaneous map from the radar 16 is developed on the tube 72, and compared by comparator 102 with the previously formed map on converter 32. These maps are of comparable resolution, namely that obtainable by the radar 16 at forty miles from the target. A non-registration signal on line 112 is then amplified at 122 and applied as an error signal via line 132 and line 130 to the inertial guidance means 42 to update the course to the target.

Similarly, when the missile reaches each of the dotted line positions as indicated at 12'', 12''', 12'''', which are 30, 20, and 10 miles, respectively, from the target, the timing signal generator provides an enabling pulse to the appropriate gate 74, 76, or 78. The instantaneous maps from the radar 16 on tubes 74, 76, and 78 will then be compared with the maps of corresponding resolution of the storage converters 34, 36, and 38. Resulting error signals on lines 134, 136, or 138 will update the course to be followed by the inertial guidance means 42 during the intervals between map comparisons.

It will be observed that as the missile 12 approaches the target T the maps being compared are of better or finer resolution, whereby the accuracy of the course corrections will be improved as the missile nears the target. The accuracy of a system employing this invention can be very high, and with presently available radar can be of the order of 5 feet. In this regard and for example, a radar 16, having a 2 foot X-Band antenna, will be only 300 feet from the target before it has the resolution which can now be obtained at 50 nautical miles by the synthetic aperture radar 14.

From the foregoing detailed description of an exemplary system embodying the invention it will be appreciated that the previously mentioned objects and advantages, as well as others apparent from the description, may be realized by this invention.

Obviously many modifications and variations of the present invention are possible in the light of the above teachings. It is therefore to be understood that within the scope of the appended claims the invention may be practiced otherwise than as specifically described.

What is claimed is:

1. A radar map comparing missile guidance system for guiding the travel of a missile having control elements from a launching aircraft to a target, said system comprising:

a variable resolution first radar mounted in said launching aircraft and capable of providing high resolution target data from a predetermined launching distance;

a second radar mounted in said missile and capable of providing high resolution target data only from positions relatively close to said target, and data of lesser resolution from positions more distant from said target;

storage means carried in said missile and separably connected to said first radar, said storage means being operative to store, prior to the time of launch, a plurality of reference maps from data provided by said first radar, each reference map having a resolution comparable to the resolution provided by said second radar at a different predetermined distance from said target;

display means for presenting instantaneous radar maps from data provided by said second radar;

gate means connecting said second radar to said display means;

timing signal generator means connected to said gate means to provide periodic enabling signals thereto whereby an instantaneous map is presented at said display means for each of a plurality of predetermined positions of said missile during its travel toward said target;

comparison means disposed between said storage means and said display means for comparing each of said instantaneous maps with one of said reference maps of comparable resolution and providing comparison signals indicative of direction and degree of non-registration of the compared maps;

comparison amplifier means for converting said comparison signals to course correction signals; and guidance means responsive to said course correction signals to condition said control elements to direct said missile toward said target.

2. A radar map comparing missile guidance system as defined in claim 1, and wherein:

said storage means comprises a plurality of scan converters, one for storing each of said reference maps.

3. A radar map comparing missile guidance system as defined in claim 2, and wherein:

said display means comprises a plurality of display tubes, equal in number to said scan converters.

4. A radar map comparing missile guidance system as defined in claim 3, and wherein:

said comparison means comprises a plurality of image comparators, each comparator being disposed between one of said converters and one of said display tubes.

5. A radar map comparing missile guidance system as defined in claim 4, and wherein:

said gate means comprises a plurality of gates, one for each of said display tubes, said gates being individually responsive to predetermined timing signals from said timing signal generator.

6. A radar map comparing missile guidance system as defined in claim 5, and wherein:

said guidance means comprises inertial guidance means operative to inertially maintain a course and is responsive to said correction signals to periodically update said course.

* * * * *